May 25, 1954 W. J. READING 2,679,309
EGG ALIGNING DEVICE
Filed May 26, 1951 2 Sheets-Sheet 1
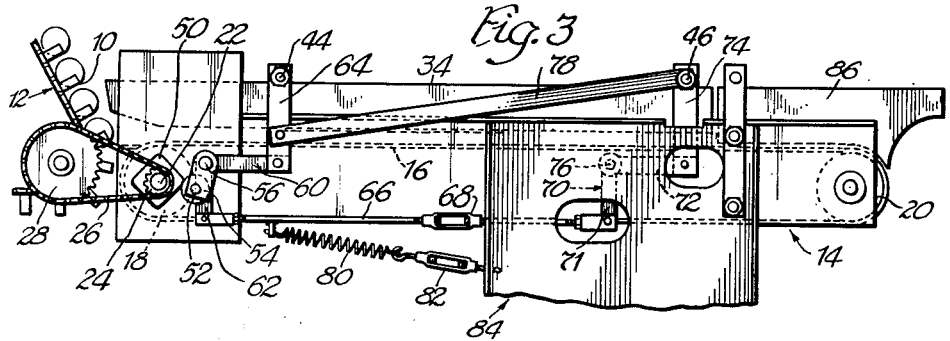
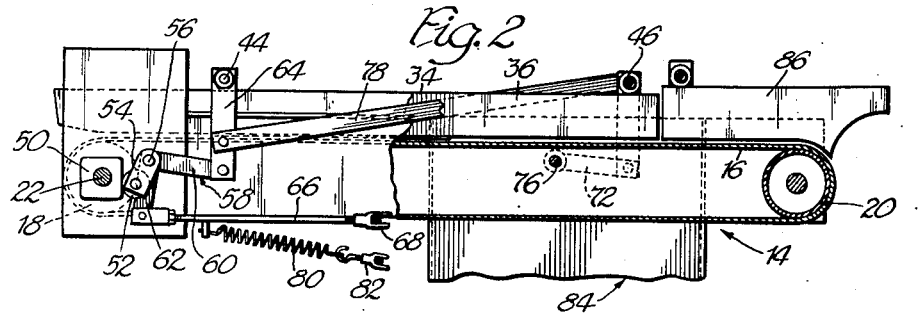
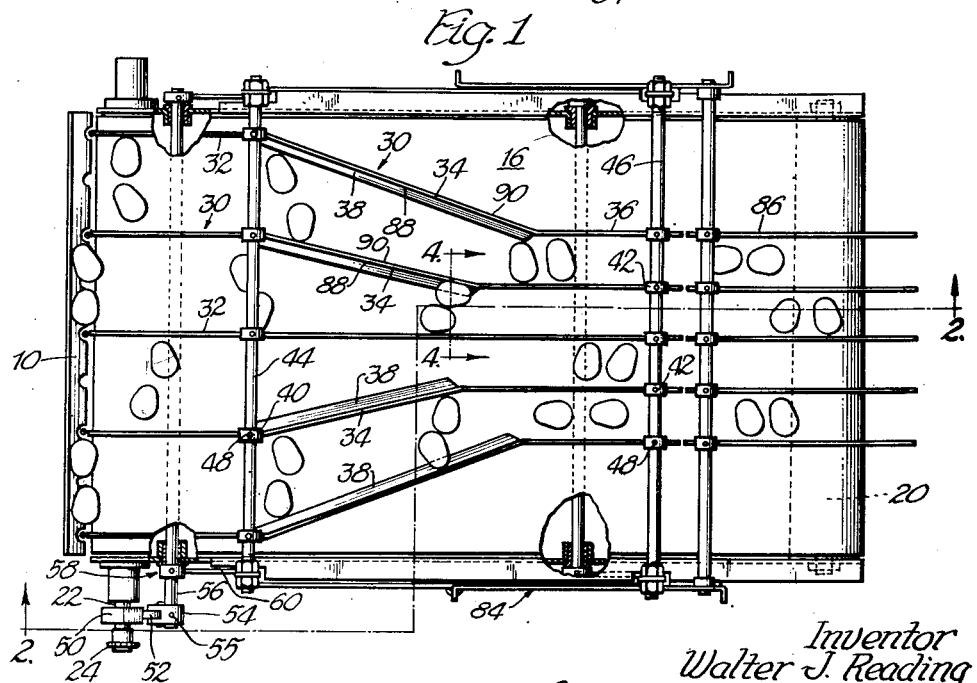
Inventor
Walter J. Reading
by Bair, Freeman & Molinare
Attys.

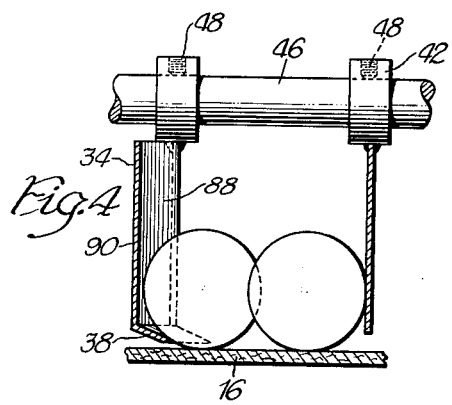
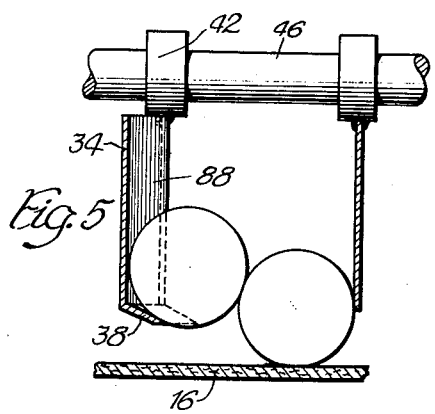
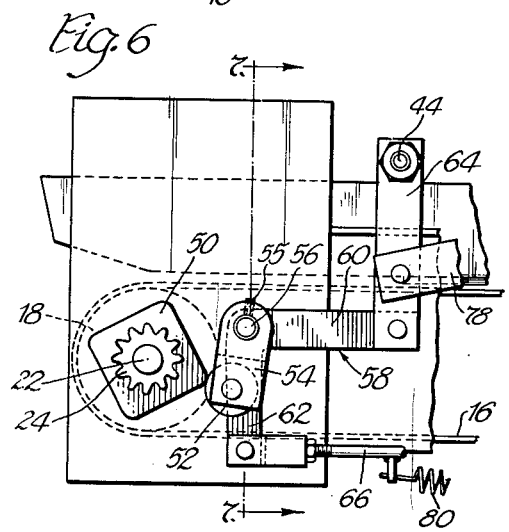
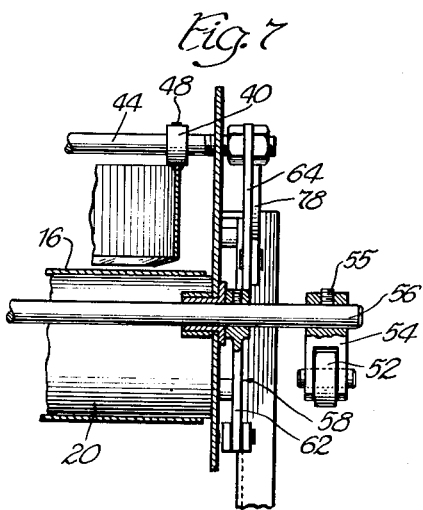
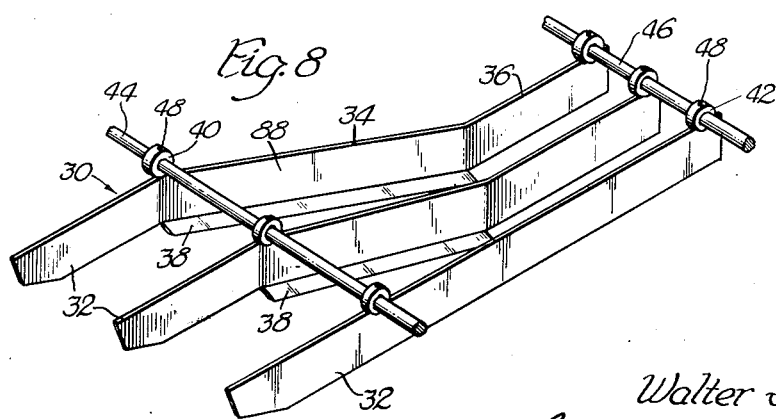

Patented May 25, 1954

2,679,309

UNITED STATES PATENT OFFICE 2,679,309

EGG ALIGNING DEVICE

Walter J. Reading, Ottumwa, Iowa

Application May 26, 1951, Serial No. 228,475

18 Claims. (Cl. 198—30)

This invention relates to an egg aligning machine and more particularly to a device for aligning bulk eggs into single file.

The processing of eggs has, to a large extent, been mechanized in recent years. Eggs which are collected from the farmers are delivered in bulk to processors who may wash, sterilize, dry, oil, break and/or dehydrate the eggs.

Between some of the processor's steps it is sometimes necessary to take the eggs which have been processed in bulk by one machine and to align them in single file for further process by additional machines. For example, this machine may be used to receive the eggs as they are discharged from the egg drying machine described in my copending application, Serial No. 181,667 filed August 26, 1950.

Usually the aligning of eggs is done by hand; and those machines which have been devised for aligning bulk eggs in single file often clog and cause considerable egg breakage.

Thus, one of the objects of this invention is to provide a machine which will receive eggs in bulk and align them in single file.

Another object of this invention is to provide an egg aligning machine which will not clog and wherein egg breakage is reduced.

A further object of this invention is to provide an egg aligning machine which is characterized by its simplicity and inexpensiveness.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a top plan view of the egg aligning machine;

Figure 2 is a side view taken on line 2—2 of Figure 1 and shows the guide strips in lowered position;

Figure 3 is a side elevation view of the machine, showing the guide strips in raised position;

Figure 4 is a greatly enlarged view taken on line 4—4 of Figure 1 and shows the guide strips in lowered position;

Figure 5 is similar to Figure 4 and shows the guide strips in raised position;

Figure 6 is an enlarged view of the cam and bell crank arrangement for raising and lowering the guide strips;

Figure 7 is a view taken on line 7—7 of Figure 6; and

Figure 8 is an enlarged perspective view of some of the guide strips.

Referring now to the drawings, there is shown in Figures 1 and 3 an egg aligning device which is adapted to receive eggs discharged from flights 10 of a conveyor 12. The conveyor 12 is part of the egg drying machine described in my said copending application, Serial No. 181,667 filed August 26, 1950.

The machine for aligning eggs consists of a conveyor generally indicated at 14 and a plurality of guide strips positioned above the conveyor. The conveyor 14 includes an endless belt 16 which is trained around rollers 18 and 20. Roller 18 is welded to a roller shaft 22. The roller shaft 22 has sprocket 24 thereon and is driven by means of chain 26 which is trained over drive gear 28, which drive gear is a part of the egg drying machine previously referred to.

As shown in Figure 1, the eggs which are discharged from the flights 10 of the egg drying machine are advanced from left to right by reason of the moving belt 16. The remainder of the egg aligning machine includes a plurality of guide strips generally indicated at 30, which are positioned to receive the eggs as they are discharged from the egg drying machine. The flights 10 are adapted to carry a plurality of eggs and these eggs are discharged in bulk onto the surface of the belt 16.

The guide strips 30 have three distinct portions, which will be referred to as an entrance portion 32, an intermediate portion 34, and an exit portion 36.

The entrance portions 32 of the guide strips 30 are positioned parallel to the direction of movement of the belt 16.

The intermediate portions 34 of the guide strips 30 are positioned at an acute angle with respect to the intermediate portion of the adjacent guide strip. Thus, the intermediate portions 34 converge toward each other and gradually reduce the spacing between adjacent guide strips. The exit portions 36 of the guide strips are also parallel to the direction of movement of the belt and are spaced apart a distance sufficient to permit a single file of eggs to pass therebetween.

The converging portions 34 of the guide strips 30 have a flange 38 attached to the bottom edge thereof. This flange 38 extends along the entire length of the converging portion 34. The flange 38, as best shown in Figures 1, 4 and 5, is spaced above the endless belt 16 and extends into the space between adjacent guide strips.

In aligning the eggs as they pass from left to right in Fig. 1, these guide strips 30 and flanges 38 are simultaneously reciprocated toward and away from the belt 16. In order to obtain simultaneous reciprocation of the guide strips 30, a framework is provided for joining the ends of the strips together.

Each guide strip 30 has a ring 40 and a ring 42 welded to the upper edge thereof. These rings are aligned so that the holes permit the insertion thereof of cross shafts 44 and 46. Each ring 40 and 42 is also provided with a set screw 48 which fixes the ring with respect to the cross shafts 44 and 46. The set screws 48 are used for varying the spacing between guide strips 30.

The framework and guide strips 30 are supported above the belt 16 and reciprocated toward and away from belt 16 by means of a linkage system which will now be described.

Mounted on roller shaft 22 is a cam 50. A cam follower or roller 52 is journalled in an arm 54 which is fixed to a shaft 56. This shaft 56 extends through the pivot point of a bell crank 58, which bell crank is also fixed to shaft 56. The bell crank 58 has a horizontal arm 60 which is pivoted as the cam follower 52 rolls over the rotating cam 50. The arcuate motion of horizontal arm 60 is transmitted to cross shaft 44 by means of upright member 64, which is pivotally connected to arm 60 and has shaft 44 journalled therein.

The bell crank 58 also has a vertical arm 62 which is connected by rods 66 and turnbuckle 69 to the vertical arm 71 of a bell crank 70. Bell crank 70 also has a horizontal arm 72, the motion of which is transmitted to cross shaft 46 by means of upright member 74.

The bell crank 70 is secured to a shaft 76 at the pivot point of the bell crank. The upright members 64 and 74 are tied together by tie member 78. The shafts 56 and 76 extend across the width of the conveyor 14 and have similar bell cranks 58 and 70 attached thereto and similar interconnecting members attached therebetween on the other side of the conveyor 14. This provides a complete framework and linkage system for reciprocating the guide strips 30 which are suspended above the conveyor 14.

In order to reduce the force necessary to reciprocate the framework and to reduce the load upon the cam 50, a means for counterbalancing the framework and guide strips is provided. This counterbalancing means includes a spring 80 attached to rod 66 at one end and attached at the other end to a turnbuckle 82. The other end of the turnbuckle is connected to a portion of the fixed supporting structure indicated at 84. The turnbuckle 82 provides a simple means of adjusting the tension of the spring 80 so as to provide various counterbalancing forces.

Also mounted above the conveyor 14 are guide strips 86 which are adjustably aligned with the exit portions 36 of the guide strips 30 and which extend beyond the discharge end of the conveyor 14 for cooperation with whatever machine is positioned there to receive the eggs in single file.

Operation

Figure 2 shows a cam follower 52 in engagement with a low point of the cam 50 and, therefore, shows the framework and guide strips 30 in their lowered position. The weight of the framework and guide strips 30 maintains the cam follower 52 against the surface of the cam 50. As a high point on the cam 50 passes the cam follower 52, the framework and guide strips 30 are raised. The alternate high and low points on cam 50 cause the reciprocation of the framework and guide strips 30. It will be noted that the same shaft which drives the conveyor belt 16 also actuates the linkage mechanism which reciprocates the guide strips 30.

As the eggs move from left to right in Figure 1, the eggs, when they pass between the converging portions 34 of adjacent guide strips 30, jam up. For example, adjacent guide strips 30 are shown spaced apart at the entrance ends to permit two eggs to pass therebetween in end-to-end relation. As the eggs move between converging portions 34, these eggs will tend to jam.

The converging portions 34 have a side 88 facing rearwardly and a side 90 facing forwardly. As the strips 30 are raised, the rearwardly facing side 88 and/or flange 38 engages a part of the egg which is immediately adjacent thereto and imposes a force upon this egg in an upward or rearward direction. It depends on what portion of the egg is in engagement with the rearwardly facing side 88 or in engagement with the flange 38, as to which type of force is imposed thereon. In some cases, a force will be imposed on the egg which has both rearward and upward components.

In any event, the force or forces imposed upon the eggs are transmitted between the eggs and cooperate with rounded surfaces of the eggs to cause the egg adjacent the rearwardly facing side 88 to be rolled either behind, or over and behind, the next adjacent jammed egg.

It should be realized that the next adjacent jammed egg primarily has forward forces applied thereto by reason of the forward motion of the conveyor belt 16; and if any force is applied to the egg by the reciprocating surface, it is only in a forward direction because the adjacent egg is in engagement with the forwardly facing side 90 of the guide strip 30. Thus, by reason of the reciprocation of the guide strips and of the forward motion of the conveyor belt 16, the eggs adjacent the rearwardly facing sides 88 are rolled behind the laterally adjacent eggs and thus are aligned in a number of files one less than the number of files of eggs prior to the jam. This realigning procedure may be continued through the length of the converging portions 34 until the eggs are aligned in single file. In the drawings, the number of files is only reduced from two to one, but the same principle could be used on a different number of files of eggs.

The height to which the guide strips 30 are raised above the belt 16 should be no more than about one-half the average diameter of the eggs. This prevents eggs from being pushed under the edge of the guide strips where the eggs may be damaged by the guide strips as they move toward the belt 16.

This height of movement of the guide strips may be controlled by adjusting the position of the cam follower 52 toward and away from cam 50. The arm 54 is arcuately adjustable on shaft 56 by means of set screw 55.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. An egg aligning machine comprising a moving surface upon which the eggs are supported, an aligning structure having an entrance end and an exit end, said aligning structure comprising a plurality of guide strips spaced above the moving surface and extending substantially in the direction of motion of the moving surface, said guide strips being laterally spaced from each other, the spacing of pairs of adjacent guide strips at the entrance end being wider than the width of a plurality of eggs, the spacing of the pairs of adjacent guide strips at the exit end being only wide enough to accommodate the movement of eggs in a single file, each pair of adjacent guide strips converging toward each other in a region between the entrance end and the exit end, one of each pair of adjacent guide strips having a flange adjacent the bottom edge thereof extending toward the other of the pair of guide strips in said converging region, said flange adapted to extend under the eggs positioned adjacent thereto, and means for reciprocating the strips in directions toward and away from said supporting surface, whereby the flanges alternately lift and lower some of the eggs to align the eggs between each pair of guide strips.

2. An egg aligning machine comprising a moving surface upon which the eggs are supported, an aligning structure having an entrance end and an exit end, said aligning structure comprising a plurality of guide strips spaced above the moving surface and extending substantially in the direction of motion of the moving surface, said guide strips being laterally spaced from each other, the spacing of pairs of adjacent guide strips at the entrance end being wider than the width of a plurality of eggs, the spacing of the pairs of adjacent guide strips at the exit end being only wide enough to accommodate the movement of eggs in a single file, each pair of adjacent guide strips converging toward each other in a region between the entrance end and the exit end, one of each pair of adjacent guide strips having a flange adjacent the bottom edge thereof extending toward the other of the pair of guide strips in said converging region, said flange adapted to extend under the eggs positioned adjacent thereto, a rigid framework joining the entrance ends and the exit ends of the guide strips together, and means for raising and lowering the framework and attached guide strips, whereby the flanges alternately lift and lower some of the eggs to align the eggs between each pair of guide strips.

3. A device as set forth in claim 2 including means for counterbalancing the framework and guide strips.

4. An egg aligning device for aligning bulk eggs into single file as the eggs move forwardly relative to said egg aligning device which is spaced above an egg supporting member; said egg aligning device comprising a plurality of guide strips having entrance ends and exit ends, said guide strips being spaced apart at their entrance ends to permit a pair of rows of eggs to enter therebetween, said guide strips being spaced apart at their exit ends to permit passage therebetween of eggs only in single file, said guide strips gradually converging in a region between the entrance and exit ends, whereby the eggs tend to jam between the converging portions of adjacent guide strips, and means including members reciprocable toward and away from said egg supporting member for applying an upward force upon some of the jammed eggs, whereby the jam is broken and the eggs are aligned in substantial single file.

5. A device as set forth in claim 4 wherein the reciprocable members for applying an upward force to some of the jammed eggs comprises at least one lateral member between each pair of guide strips, said lateral members being spaced above said supporting member and below the ends of the eggs, and means for simultaneously reciprocating the guide strips and lateral members in directions toward and away from said supporting member.

6. An egg aligning device for aligning bulk eggs as the eggs move forwardly relative to said egg aligning device which is spaced above an egg supporting member; said egg aligning device comprising a pair of guide strips having entrance ends and exit ends, said guide strips being spaced apart at their entrance ends to permit a plurality of rows of eggs to enter therebetween, said guide strips being spaced apart at their exit ends to permit passage therebetween of eggs in a number of files less than the number of rows of eggs entering between the guide strips, said guide strips gradually converging in a region between the entrance and exit ends, whereby the eggs tend to jam between the converging portions of the guide strips, means including a member reciprocable toward and away from said egg supporting member for intermittently applying an upward force on some of the jammed eggs, whereby some eggs tend to roll around adjacent jammed eggs so that the eggs realign themselves in files of one less than the number of previous files before the jam, said files being similarly successively reduced until the number of egg files is equal to the number which will pass between the exit ends of the guide strips.

7. A device as set forth in claim 6 wherein the spacing of the guide strips at their exit ends permits passage therebetween of eggs only in a single file.

8. An egg aligning device for aligning bulk eggs into single file as the eggs move forwardly relative to said egg aligning device which is spaced above an egg supporting member; said egg aligning device comprising a plurality of guide strips having entrance ends and exit ends, said guide strips being spaced apart at their entrance ends to permit a pair of rows of eggs to enter therebetween, said guide strips being spaced apart at their exit ends to permit passage therebetween of eggs in single file, said guide strips gradually converging in a region between the entrance and exit ends, the converging portion of each guide strip having one side facing in a rearwardly direction and the other side facing in a forwardly direction, said eggs tending to jam between the converging portions of the guide strips, means for applying an upward force upon some of the jammed eggs, said means comprising a lateral member between each pair of guide strips extending from adjacent the rearwardly facing side of the converging portion of said guide strip toward the opposite guide strip, said lateral members being spaced below the ends of the eggs, and means for simultaneously reciprocating the guide strips and said lateral members in up and down directions.

9. An egg aligning device for aligning bulk eggs into single file as the eggs move forwardly relative to said egg aligning device which is spaced above an egg supporting member; said egg aligning device comprising a plurality of guide strips having entrance ends and exit ends, said guide strips being spaced apart at their entrance ends to permit a pair of rows of eggs to enter therebetween, said guide strips being spaced apart at their exit ends to permit passage therebetween of eggs in single file, said guide strips gradually converging in a region between the entrance and exit ends, the converging portion of each guide strip having one side facing in a rearwardly direction and the other side facing in a forwardly direction, said eggs tending to jam between the converging portions of the guide strips, the converging portion of the guide strip having a flange adjacent the bottom edge thereof and extending from adjacent the side of the guide strip facing in a rearwardly direction toward the opposite guide strip, and means for simultaneously reciprocating the guide strip and flanges in up and down directions.

10. A device as set forth in claim 9 wherein said flange extends along the entire length of the converging portion of the guide strip.

11. An egg aligning device for aligning bulk eggs into single file as the eggs move forwardly relative to said egg aligning device which is spaced above an egg supporting member; said egg aligning device comprising a plurality of guide strips having entrance and exit ends, said guide strips being spaced apart at their entrance ends to permit a pair of rows of eggs to enter therebetween, said guide strips being spaced apart at their exit ends to permit passage therebetween of eggs in single file, said guide strips gradually converging in a region between the entrance and exit ends, the converging portion of each guide strip having one side facing in a rearwardly direction and the other side facing in a forwardly direction, said eggs tending to jam between the converging portions of the guide strips, the converging portion of said guide strip having a flange adjacent the bottom edge thereof and extending from adjacent the side of the guide strip facing in a rearwardly direction toward the opposite guide strip, a rigid framework joining the entrance ends and the exit ends of the guide strips together, and means for raising and lowering the framework and attached guide strips.

12. A device as set forth in claim 11 including means for counterbalancing the framework and guide strips.

13. An egg aligning machine comprising a moving member upon which the eggs are supported, an aligning structure having an entrance end and an exit end, said aligning structure comprising a plurality of guide strips spaced above the moving member and extending substantially in the direction of motion of the moving member, said guide strips being laterally spaced from each other, the spacing of pairs of adjacent guide strips at the entrance end being wider than the width of a plurality of eggs, the spacing of the pairs of adjacent guide strips at the exit end being only wide enough to accommodate the movement of eggs in a single file, each pair of adjacent guide strips converging toward each other in a region between the entrance end and the exit end, one of each pair of adjacent guide strips having a flange adjacent the bottom edge thereof extending toward the other of the pair of guide strips in said converging region, said flange adapted to extend under the eggs positioned adjacent thereto, and means for reciprocating the strips in directions toward and away from said moving member, whereby the flanges alternately lift and lower some of the eggs to align the eggs between each pair of guide strips, the greatest spacing between said guide strips and said moving member during the reciprocation of said guide strips being substantially one-half the diameter of the eggs.

14. A device for aligning objects which are in mass as the objects move forwardly relative to said aligning device which is spaced above an object supporting member; said aligning device comprising a plurality of spaced apart guide strips having entrance and exit ends, each pair of adjacent guide strips defining an aisle therebetween, the width of said aisle at the entrance end thereof being sufficient to permit a plurality of rows of objects to enter therein, said guide strips being spaced apart at their exit ends to permit passage therebetween of objects in a number of rows less than the number of rows of objects entering between the guide strips, said guide strips gradually converging in a region between the entrance and exit ends, whereby the objects tend to jam between the converging portions of the guide strips, a lateral member in each aisle positioned adjacent the lower edge of one of said guide strips, means for reciprocating said lateral members in up and down directions to apply upward forces on some of the jammed objects, whereby some objects tend to roll around adjacent jammed objects so that the objects realign themselves in rows of one less than the number of previous rows before the jam, and said rows being similarly successively reduced until the number of rows of objects is equal to the number of rows which will pass through the exit end of an aisle.

15. A device for aligning objects which are in mass as the objects move forwardly relative to said aligning device which is spaced above an object supporting member; said aligning device comprising a plurality of spaced apart guide strips having entrance and exit ends, each pair of adjacent guide strips defining an aisle therebetween, the width of said aisle at the entrance end thereof being sufficient to permit a plurality of rows of objects to enter therein, said guide strips being spaced apart at their exit ends to permit passage therebetween of objects in a number of rows less than the number of rows of objects entering between the guide strips, said guide strips gradually converging in a region between the entrance and exit ends, whereby the objects tend to jam between the converging portions of the guide strips, a lateral member in each aisle secured to the lower edge of one of the guide strips defining said aisle, means for simultaneously reciprocating the guide strips and lateral members in up and down directions to apply upward forces on some of the jammed objects, whereby some objects tend to roll around adjacent jammed objects so that the objects realign themselves in rows of one less than the number of previous rows before the jam, and said rows being similarly successively reduced until the number of rows of objects is equal to the number of rows which will pass through the exit end of an aisle.

16. An egg aligning device comprising a conveyor member upon which the eggs are supported, a pair of elongated guide strips positioned above said conveyor member and spaced apart a distance large enough to permit passage therebetween of at least one file of eggs, and means for breaking up egg jams which occur when a number of eggs greater than that which can be accommodated between said pair of guide strips attempt to pass simultaneously between said guide strips, said means comprising a jam-breaking member positioned between said pair of guide strips, and above said conveyor member a distance less than one-half the width of an egg, said jam-breaking member being positioned adjacent a guide strip, whereby it is adapted to extend below a portion of an egg engaging the portion of the guide strip thereabove, and means for reciprocating said jam-breaking member in directions toward and away from said conveyor member.

17. An egg aligning device comprising a conveyor member upon which the eggs are supported, a pair of elongated guide strips positioned above said conveyor member and spaced apart a distance large enough to permit passage therebetween of at least one file of eggs, and means for breaking up egg jams which occur when a number of eggs greater than that which can be accommodated between said pair of guide strips attempt to pass simultaneously between said guide strips, said means comprising a jam-breaking member positioned between said pair of guide strips and secured to the lower edge of one of said guide strips, said jam-breaking member being positioned above said conveyor a distance less than one-half the width of an egg, and means for reciprocating the guide strip and jam-breaking member attached thereto in directions toward and away from said conveyor member.

18. A device for aligning eggs which are in mass as the eggs move forwardly relative to said aligning device which is spaced above an egg supporting member; said aligning device comprising at least one pair of spaced apart guide strips defining an aisle therebetween, the width of said aisle being sufficient to accommodate the passage of at least one file of eggs, and means for breaking up egg jams which occur when a number of eggs greater than that which may be accommodated between said pair of guide strips attempt to pass simultaneously between said guide strips, said means comprising a jam-breaking member positioned in each aisle above said supporting member and adapted to extend below portions of some of the jammed eggs, and means for reciprocating said jam-breaking member in directions toward and away from said supporting member to apply upward forces on some of the jammed eggs, whereby some eggs tend to roll around and behind adjacent jammed eggs so that the eggs align themselves into the number of files which will be accommodated by said aisle.

References Cited in the file of this patent

UNITED STATES PATENTS

| Number | Name | Date |
|---|---|---|
| 791,243 | Carlson | May 30, 1905 |
| 804,459 | Ellingwood | Nov. 14, 1905 |
| 1,755,721 | Winkler | Apr. 22, 1930 |
| 2,153,296 | Brogden | Apr. 4, 1939 |
| 2,620,059 | Niederer | Dec. 2, 1952 |